United States Patent
de la Chevasnerie et al.

(10) Patent No.: US 10,069,353 B2
(45) Date of Patent: Sep. 4, 2018

(54) SERVO VALVE TORQUE MOTOR

(71) Applicant: GOODRICH ACTUATION SYSTEMS SAS, Buc (FR)

(72) Inventors: Arnaud de la Chevasnerie, Ville d'Avray (FR); Audrey La Marca, Guyancourt (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 275 days.

(21) Appl. No.: 14/661,697

(22) Filed: Mar. 18, 2015

(65) Prior Publication Data

US 2015/0270748 A1    Sep. 24, 2015

(30) Foreign Application Priority Data

Mar. 19, 2014 (EP) .................................. 14305385

(51) Int. Cl.
| | |
|---|---|
| *H02K 1/18* | (2006.01) |
| *F15B 9/09* | (2006.01) |
| *H02K 1/17* | (2006.01) |
| *F15B 13/043* | (2006.01) |

(52) U.S. Cl.
CPC .............. *H02K 1/185* (2013.01); *F15B 9/09* (2013.01); *F15B 13/0436* (2013.01); *F15B 13/0438* (2013.01); *H02K 1/17* (2013.01)

(58) Field of Classification Search
CPC .... F15B 9/09; F15B 13/0436; F15B 13/0438; H02K 1/17; H02K 1/185; H01F 7/14

USPC .................................................. 310/154.11
See application file for complete search history.

(56) References Cited

U.S. PATENT DOCUMENTS

| | | | |
|---|---|---|---|
| 2,933,106 A | 4/1960 | Cox | |
| 3,117,585 A | 1/1964 | Collins | |
| 3,556,150 A | 1/1971 | King | |
| 4,794,941 A | 1/1989 | Godon | |
| 2010/0225197 A1* | 9/2010 | Fulford | H02K 1/143 310/216.111 |
| 2010/0289348 A1* | 11/2010 | Gruendl | H02K 9/22 310/54 |
| 2014/0110508 A1* | 4/2014 | Dames | H01F 7/1646 239/585.1 |

OTHER PUBLICATIONS

European Search Report for Application No. 14305385.8-1754, dated Apr. 9, 2014, 6 Pages.

* cited by examiner

*Primary Examiner* — Alex W Mok
(74) *Attorney, Agent, or Firm* — Cantor Colburn LLP

(57) ABSTRACT

A servo valve torque motor apparatus including a pair of pole pieces; one or more permanent magnet(s) held between the pole pieces an armature supported between the pole pieces for rotation about an axis; the armature being for connection to a member that resists rotation of the armature; and a coil on the armature; wherein when an electrical current is passed through the coil the armature is rotated against the member; and wherein the magnet(s) is/are secured to the two pole pieces by mechanical fixings passing through holes in the magnet(s).

13 Claims, 5 Drawing Sheets

SERVO VALVE TORQUE MOTOR

FOREIGN PRIORITY

This application claims priority to European Patent Application No. 14305385.8 filed Mar. 19, 2014, the entire contents of which is incorporated herein by reference.

TECHNICAL FIELD

This invention relates to a servo valve torque motor for use in an electrohydraulic servo valve. The electrohydraulic servo valve may be used as part of an actuator in aerospace applications.

BACKGROUND

Electrohydraulic servo valves are continuously acting valves that transform an electrical input signal into a stepless hydraulic output (flow or pressure). Servo valves can provide precise control of position, velocity, pressure and force. Most commonly they are mounted on linear or rotary actuators to transform an electrical control signal into linear or rotary motion output of an actuator e.g. for machinery position control. Many aircraft flight controls and engine controls are actuated using servo valves. For example, in rotorcraft such as helicopters both the main and tail rotor actuators may incorporate servo valves. Servo valve applications include aerospace, climate control, fluid & gas handling, hydraulics, pneumatics, and process control.

A typical electrohydraulic servo valve comprises an electrical torque motor as a first stage for controlling flow of a hydraulic fluid that drives a spool valve in a second stage. The second stage can in turn control hydraulic flow to an actuator driving a load. The hydraulic second stage typically comprises a spool and sleeve, for example a conventional four-way spool design in which the output from the valve, at a fixed pressure drop, is proportional to spool displacement from the null position. A hydraulic amplifier acts between the first and second stages to vary the piloting flow. The hydraulic amplifier can have various different designs, for example a jet pipe and receivers, a jet deflector and receivers, or a nozzle flapper.

In a jet pipe servo valve, hydraulic fluid at system pressure is directed through a jet tube towards receiver ports that are connected to the second stage spool. At the null position of the valve, the jet is directed equally between the receiver ports so that there is equal pressure on both sides of the spool. Deflection of the jet tube splits the flow unevenly between the receiver ports so as to create a differential pressure from one end of the spool to the other. The differential pressure created across the spool moves it in a direction opposite to the jet displacement.

SUMMARY

Viewed from a first aspect, the invention provides a servo valve torque motor apparatus comprising: a pair of pole pieces; one or more permanent magnet(s) held between the pole pieces; an armature supported between the pole pieces for rotation about an axis; the armature being for connection to member that resists rotation of the armature; and a coil on the armature; wherein when an electrical current is passed through the coil the armature is rotated against the member; and wherein the magnet(s) is/are secured to the two pole pieces by mechanical fixings passing through holes in the magnet(s).

Prior art torque motors use an interference or friction fit. A mechanical fixing may be more resistant to vibration and hence this permits the servo valve torque motor to be used where vibrations are a problem.

The mechanical fixings may for example be bolts or screws. They may be secured to threaded holes in one or both pole pieces and/or secured by threaded nuts. The mechanical fixings may be made of non-magnetic material, for example Inconel alloy 718. This may improve the magnetic characteristics of the magnets with the fixings in place.

The magnet(s) may be AlNiCo magnets, which may be formed as columns to be fitted between the pole pieces, for example with holes through the columns along the axis of the column. The columns may be generally cylindrical. Advantageously, the torque motor of the first aspect may also be used with SmCo magnets. The torque motor may be made to be used interchangeably with either AlNiCo or SmCo magnets by the use of spacer columns to support the SmCo magnets. SmCo magnets to provide the same magnetic flux as AlNiCo magnets will be smaller in size. In example embodiments the SmCo magnets are made in columns with the same cross-section as an equivalent AlNiCo magnet but a shorter height. By equivalent AlNiCo magnet it is meant that the magnet has a similar strength.

The spacer columns are used to compensate for the difference in height and may have the same cross-section as the magnets. Both the spacer columns and the magnets have holes for the mechanical fixings. The spacer columns may be made of a soft magnetic material, for example they may be made of the same material that the pole pieces and/or armature are made from.

The pole pieces and/or the armature may be made of FeNi49 or FeNi80, for example. The pole pieces and armature may be made of the same material. There may be less saturation and better performance if the same material is used.

It will be appreciated that the use of mechanical fixings for the magnets means that the magnets can be interchangeable and replaceable. The magnet arrangements discussed above can easily be removed and swapped over. The use of mechanical fixings allows for the torque motor performance to be adjusted by the use of different magnet families without any other change to the torque motor, i.e. whilst using the same pole pieces and so on. The performance of a servo valve is directly linked to its torque motor performance, so this in turn can control the servo valve performance.

It is useful to be able to further adjust the magnet performance of the torque motor and this can be done in various ways. For AlNiCo magnets, as is known, adjustment can be made by magnetization and demagnetization. It is also proposed to adjust the magnet performance by adjusting the size of an air gap between the pole pieces and the armature, for example between poles of the pole pieces and the armature. Moving the pole pieces up or down relative to the armature can adjust the relative sizes above and below the armature. This can be used to 'balance' the torque motor or to provide a bias, i.e. a torque that is applied due to magnetism even when no current is flowing. The total size of the air gap may be adjusted for SmCo magnets. The total size of the air gap may be adjusted by the use of shims and/or by the use of spacer columns of differing sizes.

The magnetic field pattern is important to the operation of the torque motor. The torque motor may have multiple permanent magnets between the pole pieces. Preferably the magnets are symmetrically arranged. For example there may be two or four magnets symmetrically arranged in relation to the shape of the pole pieces and/or the location of the armature and its axis of rotation. Each magnet has a hole through it for mechanical fixing to the pole pieces. Where SmCo magnets are used with spacer columns then the spacer columns are provided for each of the multiple magnets.

In one example the pole pieces are generally C-shaped. The C-shaped pole pieces may hold four magnets in a symmetrical arrangement. For example there may be one magnet at one end of the C-shape, two magnets on the arc of the C-shape, and one magnet at the other end of the C-shape, such that the magnets are at four corners of a rectangle. The arc of the C-shape may be centred on the midpoint of the armature.

The armature may be arranged to, at rest, have an end piece placed between two poles of the pole pieces. In some examples the armature is symmetrically arranged about the axis of rotation. In this case the armature may have two end pieces, each placed between two poles of the pole pieces. Thus, the pole pieces may each have a pair of poles that are above and below the end pieces of the armature. The poles of the pole pieces may be symmetrically placed relative to the locations of the magnets. The rotation of the armature is such that the end pieces move toward and away from the poles.

The coil may have windings about the armature. The motor may include multiple coils on the armature. For example, there may be two coils with windings about the armature. The two coils may be on two sides of the axis of rotation of the armature.

The torque motor may include a member coupled to the armature for resisting rotation of the armature. This may be a member that operates in bending or in torsion to provide a force that opposes rotational movement of the armature. For example, a torsion spring may be used. The torsion spring may take any suitable form, provided that it will produce a force in opposition to rotation of the armature. For example, it may be a torsion beam along the axis of rotation or a flexure tube. A mechanical spring may be used, such as a helical or spiral torsion spring, or a helical spring coupled to a beam to oppose rotation of the beam, with the beam being coupled to the armature.

BRIEF DESCRIPTION OF THE DRAWINGS

Also provided is an electrohydraulic servo valve comprising a servo valve torque motor as described above. The electrohydraulic servo valve may be a part of an actuator for aerospace use.

Example embodiments of the servo valve torque motor will now be described by way of example only and with reference to the accompanying drawings, in which.

DETAILED DESCRIPTION

Figure 1:
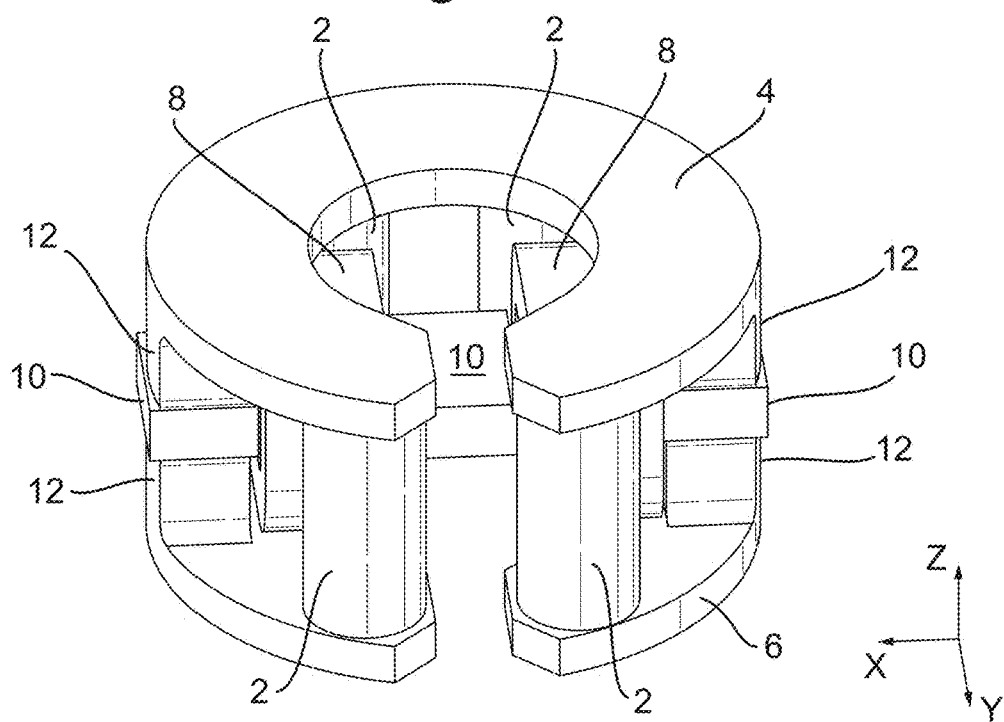
FIG. 1 shows a schematic view of a servo valve torque motor with a first type of magnets.
Figure 2:
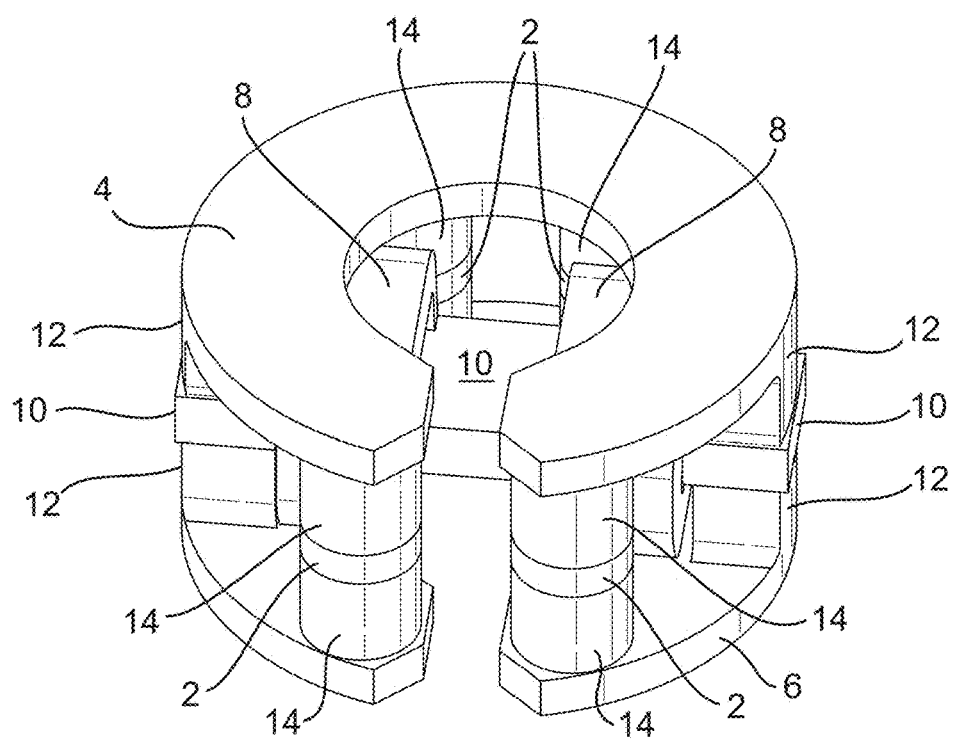
FIG. 2 shows a schematic view of a servo valve torque motor with a first type of magnets.

The main parts of the servo valve torque motor are shown in FIG. 1 and FIG. 2 in simplified views with two different types of magnets 2. The torque motor includes two C-shaped pole pieces 4, 6 that hold the magnets 2 between them. The pole pieces 4, 6 are made of a soft magnetic material and have a similar shape, with the upper pole piece 4 being generally a mirror image of the lower pole piece 6. There are four magnets 2 mounted symmetrically between the pole pieces 4, 6, with one pair of magnets at the two ends of the C-shape, and the other pair placed with a similar spacing to the first pair and centred on the mid-point of the C-shape. The four magnets 2 are hence at four corners of a rectangle, with the pole pieces 4, 6 each starting at a first corner of the rectangle, extending in an arc through the second and third corners of the rectangle, and finishing at the fourth corner of the rectangle.

The motor also includes a pair of coils 8 coupled to an armature 10 mounted at its centre to a torsion beam or flexure tube (not shown). The coils 8 have windings passing around the armature 10 at two sides of the armature 10. The outer ends of the armature 10 extend between soft magnetic poles 12 of the pole pieces 4, 6. The armature 10 is supported for rotational movement about the centre of the C-shaped pole pieces 4, 6, with the ends of the armature 10 moving toward or away from the pole pieces, rotating about the Y-axis in FIG. 1. Thus, when the coils 8 are energised then the interaction of the coils 8 with the magnetic flux of the magnets 2 and pole pieces 4, 6 means that the armature 10 will apply a torque about the Y-axis countered by a torque from the torsion beam or flexure tube. The armature 10 will rotate about the Y-axis until the torques are balanced. By varying the current supplied to the coils 8 the amount of rotation of the armature 10 can be controlled. This allows the torque motor to accurately control the servo valve and hence, for example, to accurately control the first stage of an electrohydraulic servo valve. It will be appreciated that in this example the torque motor is a limited angle torque motor, since the armature 10 cannot rotate fully.

The magnets 2 are fixed to the pole pieces 4, 6 by mechanical fixings extending through holes along the length of the magnets 2. A bolt or a screw may be used to fix the magnets 2. The use of a mechanical fixing makes some embodiments of the torque motor more resistant to vibrations than prior art torque motors that use interference or friction fit to secure the magnets. In addition, the hole along the centre of the magnets may improve the magnetic properties and changes the shape of the magnetic field for some embodiments. In relation to the magnetic properties the mechanical fixings may be non-magnetic.

In FIG. 1 the magnets 2 are AlNiCo magnets. They can be made by grinding cast magnets into a cylinder and then boring a hole through the centre for the mechanical fixings. In FIG. 2 the magnets 2 are SmCo magnets and the torque motor includes additional soft magnetic material columns 14 supporting the magnets 2. The SmCo magnets have the same cross-section as the AlNiCo magnets but a shorter height. The columns 14 compensate for the height difference. It will be appreciated that the design of the torque motor of FIGS. 1 and 2 means that the AlNiCo magnets and the SmCo magnets (with columns 14) are interchangeable. For a given overall design (armature, pole pieces and coils) identical torque characteristics at zero current will be obtained using either of the two magnet types.

AlNiCo magnets have adjustable magnetization. This is useful for adjusting the gain of the torque motor. It is beneficial for some embodiments to have a torque motor design that can use magnets with adjustable magnetization. The SmCo magnet has a fixed magnetization. This is also an advantage in some situations, since the torque motor cannot be affected by proximity to other magnetic devices. Thus it is beneficial to have a torque motor design in some embodiments that can use magnets with adjustable magnetization. A design that can be used with either type of magnet is very flexible and can be adapted to a large range of possible applications.

The gain of the torque motor with the SmCo magnets can be adjusted by changing the size of the air gap between the armature 10 and the poles 12 of the pole pieces 4, 6. An example mechanism for doing this is a shim or shims at an appropriate location below the pole pieces 4, 6, to adjust the distance between the lower pole piece and a base to which the torque motor is mounted. Using differently sized columns 14 for SmCo magnets 2 allows the total size of the air gap to be adusted. The relative size of the air gap at the top and bottom of the armature 10 can also be adjusted. Changes in the relative size can provide a torque motor with a bias, i.e. a torque that is applied 'at rest' when there is no electrical current flowing. The same mechanism can be used to adjust the relative sizes of the air gap with AlNiCo magnets as well, which means that there is a dual adjustment possible for AlNiCo magnets: adjusting the level of magnetism and adjusting the relative sizes of the upper and lower air gaps. The total size of the air gap is not adjusted for AlNiCo magnets, and hence the sum of the upper and lower air gaps is always the same in that case.

Figure 3:
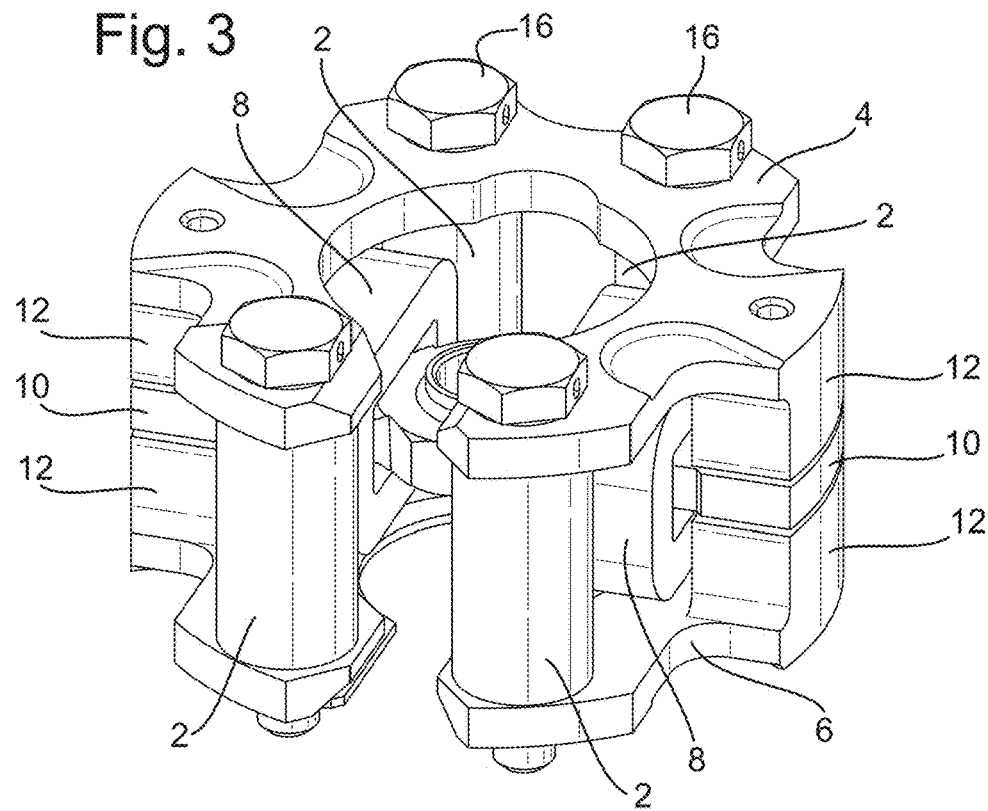
FIG. 3 is a perspective view of a servo valve torque motor similar to FIG. 1 with full details of the shape and structure of the device.
Figure 4:
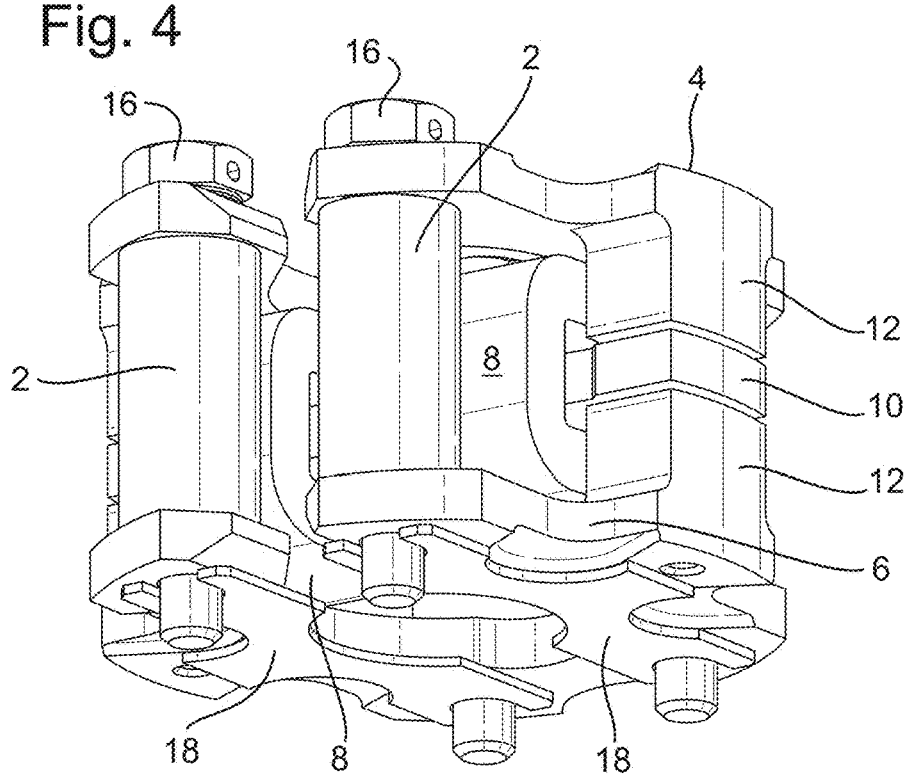
FIG. 4 another view of the servo valve torque motor of FIG. 4 with the lower side of the torque motor visible.

FIGS. 3 and 4 show another example torque motor with more detailed features of the shape and structure of the device. As well as the basic features described above; magnets 2, pole pieces 4, 6 with poles 12, coils 8 and armature 10; FIGS. 3 and 4 also show bolts 16 used to mechanically fix the magnets 2 to the pole pieces 4, 6. The bolts 16 are made of non-magnetic material and pass through holes along the centres of the magnets 2. In addition, FIG. 4 shows the shim 18 that is used to adjust the size of the air gap between the armature 10 and the poles 12. When AlNiCo magnets 2 are used, as shown in the Figure, the shim 18 acts to adjust the relative size of the air gaps above and below the armature 10. A larger shim 18 will push the pole pieces 4, 6 upwards and hence the upper air gap will become smaller whilst the lower air gap becomes larger. A smaller shim 18 has the opposite effect. When the magnets 2 are SmCo magnets with spacer columns 14 then by the use of the shim 18 and different sized columns 14 the total size of air gap between the armature 10 and poles 12 can be adjusted as well as adjusting the relative size of the upper and lower air gaps.

Figure 5:
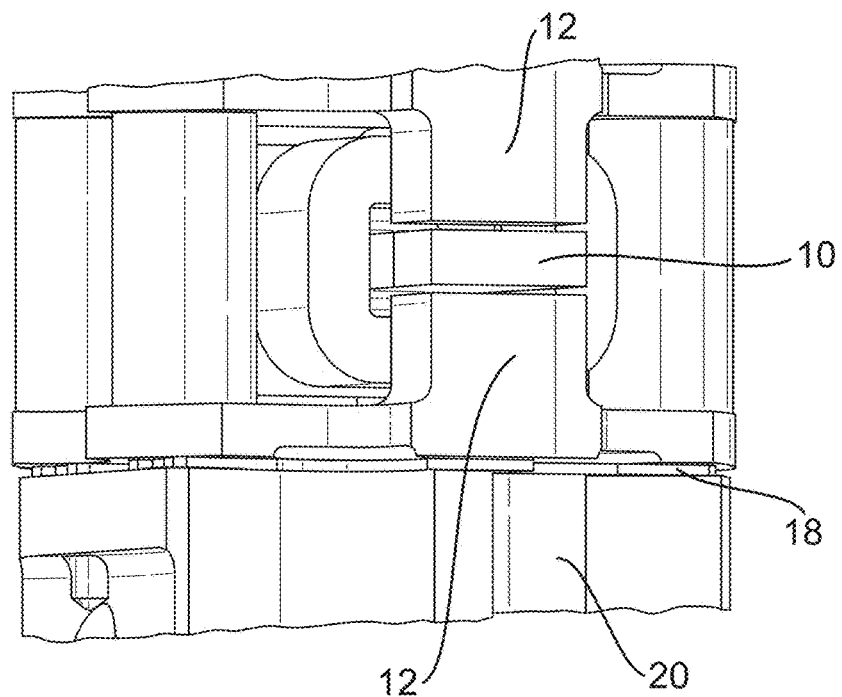
FIG. 5 illustrates the use of a shim between the pole pieces of the torque motor and a base.

FIG. 5 shows a view of the torque motor of FIGS. 3 and 4 mounted to a base 20. This more clearly illustrates the use of the shim 18. The shim 18 moves the pole pieces and poles 12 away from the base 20. Since the armature 10 is mounted to the base 20 via a flexure tube or similar then the size of the shim 18 determines the size of the air gaps above and below the armature.

As can be seen in FIGS. 3 to 5 the C-shape of the pole pieces 4, 6 need not be a smooth sided C-shape as in FIGS. 1 and 2. The C-shape can include wider sections at the poles 12 and at the locations where the bolts 16 secure the magnets 2. Also visible in FIG. 3 is a mounting point at the middle of the armature 10, where a torsion beam or flexure tube could be mounted.

Figure 6A:
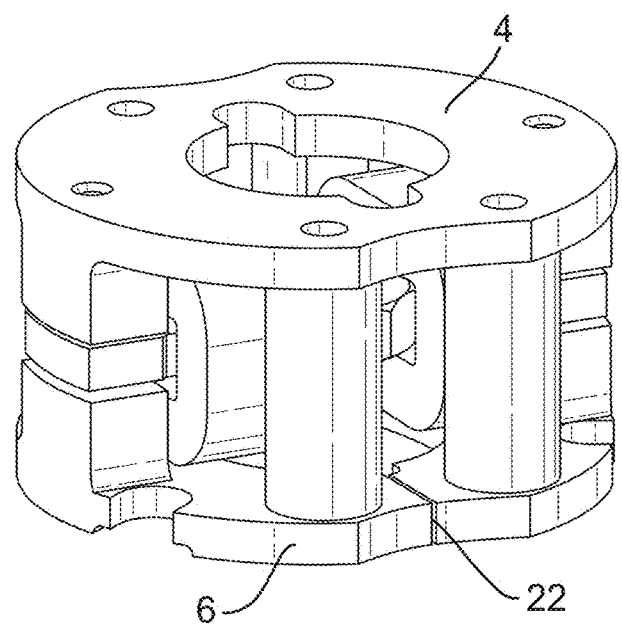
FIGS. 6*a*, 6*b* and 6*c* show alternative arrangements for the pole pieces.
Figure 6B:
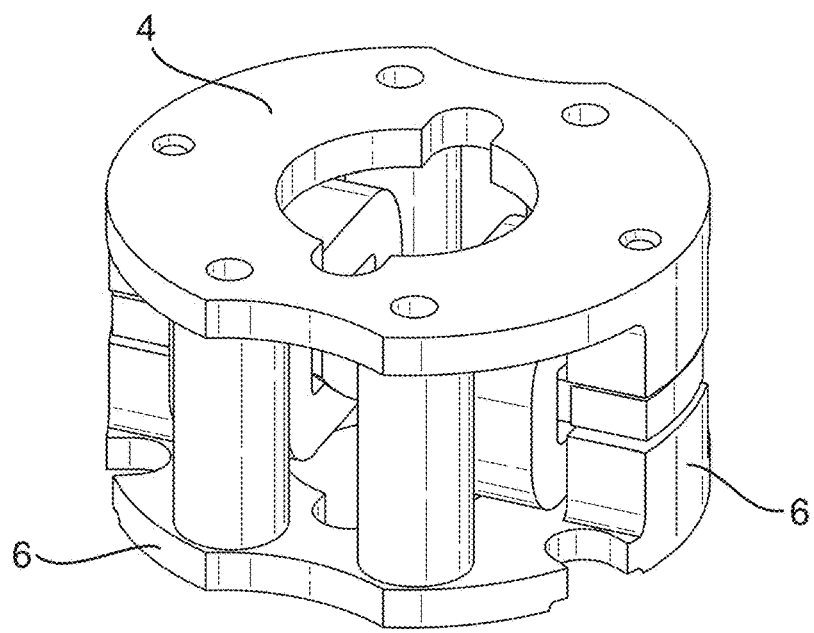
Figure 6C:
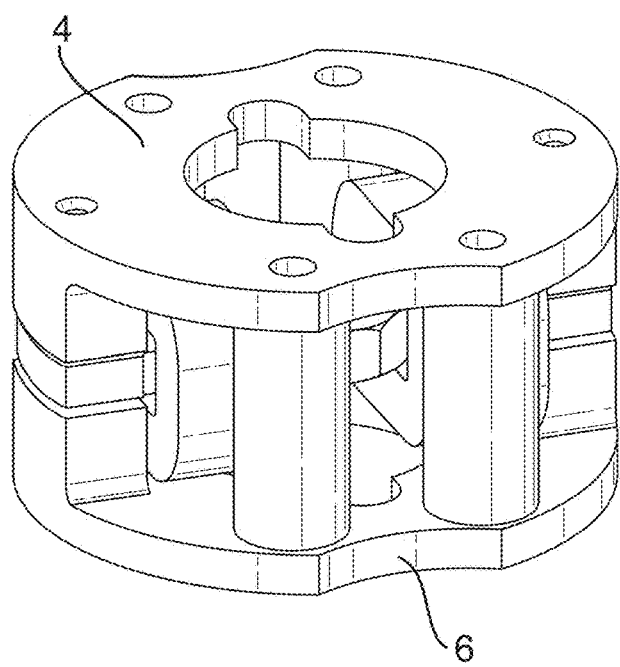

FIGS. 6a, 6b and 6c show further alternative designs for the pole pieces. Other parts of the torque motors of these Figures are similar to the torque motor of FIGS. 3 to 5 and hence are not discussed further. The pole pieces 4, 6 differ since the upper pole piece 4 is a full circle, without any break or air gap, and the lower pole piece 6 also has either no break in it (FIG. 6c) or has just a small split forming a minimal air gap 22. This small air gap 22 can be aligned with one of the the poles 12 as in FIG. 6b, or placed between two of the magnets 2 as in FIG. 6a. Variations in the shape of the pole pieces 4, 6 can be used to adjust the magnetic characteristics of the torque motor. The shim can also be used as a part of the magnetic circuit.

Figure 7:
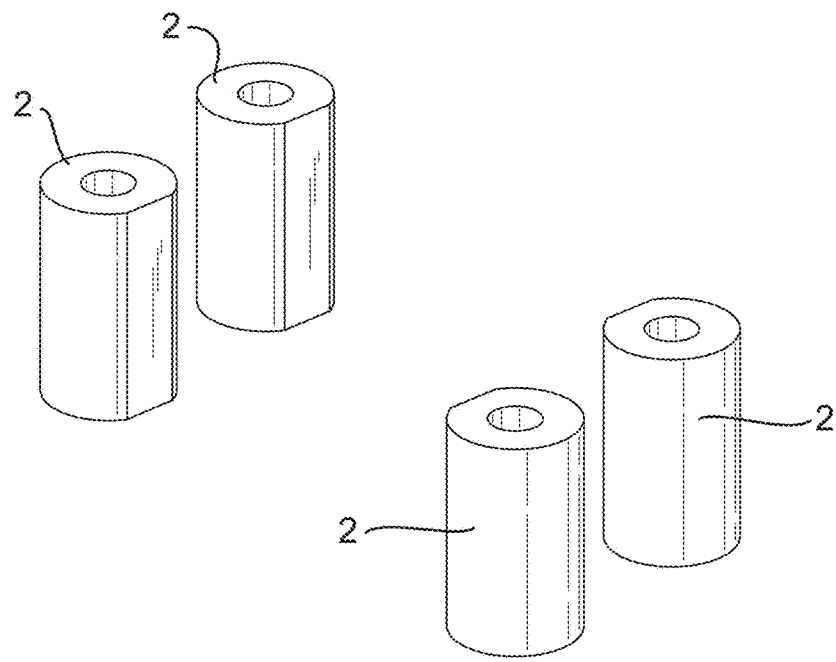
FIG. 7 shows a variation in the shape of the magnets of the torque motor of FIGS. 3 to 6.
Figure 8:
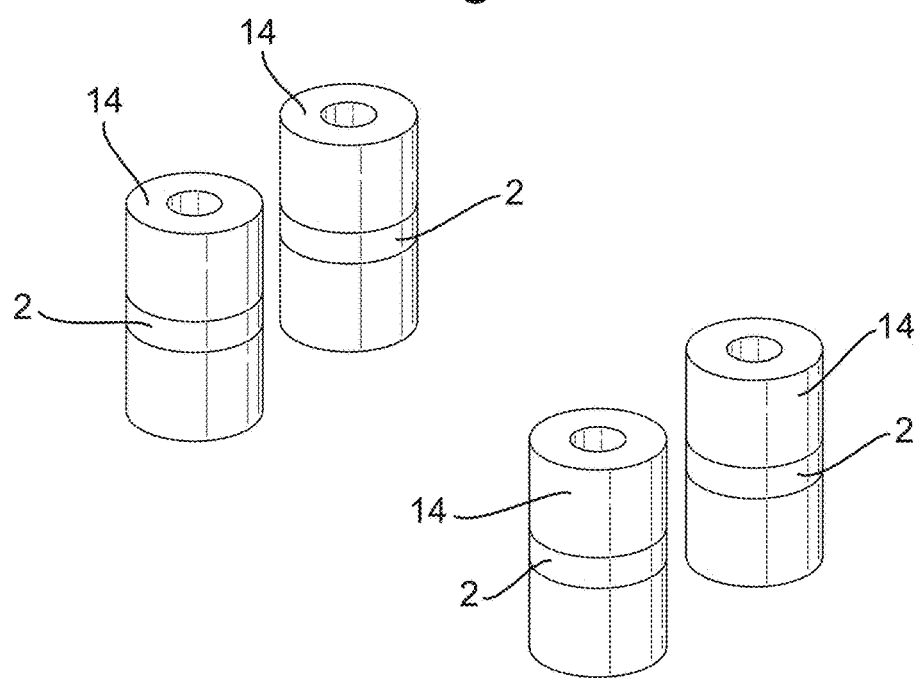
FIG. 8 shows alternative magnets for the torque motor of FIGS. 3 to 6, with this alternative being similar to the magnets of FIG. 2.

The magnets 2 of FIGS. 3 to 6 are illustrated as AlNiCo magnets. They are cylindrical in shape with a hole through the centre for the bolts 16. The exact shape for the magnets 2 can be varied provided of course that the holes remain for the mechanical fixings. For example, as shown in FIG. 7, the cylindrical shape may have a flat spot at one side. Such changes in the geometry of the magnet can be used to vary the shape of the magnetic field. In addition, as with the torque motor illustrated in FIGS. 1 and 2 the AlNiCo magnets can easily be replaced by SmCo magnets supported on spacer columns 14 as shown in FIG. 8. Both the magnets 2 and the columns 14 have a hole through the centre for the mechanical fixing, such as the bolts 16 shown in FIGS. 3 and 4.

The servo valve torque motor can be used in an electro-hydraulic servo valve, for example for use in an aerospace actuator. In a possible servo valve design, a flexible member (e.g. flexure tube or torsion beam) may be rigidly attached to the torque motor armature. A beam may be also attached to the flexible member and to the armature. This beam permits the variation of the piloting flow produced by the hydraulic amplifier. Upon application of an electrical signal to the torque motor, the armature pivots and makes the flexible member and the beam bend, causing the beam to deflect and a differential pressure to be created across the spool. Electrical or mechanical feedback may be provided to return the beam to its null position.

In a mechanical feedback system, a feedback spring may be used to equilibrate the torque applied by the first stage. This mechanical feedback system is fixed at one end to the spool and at the other end to the beam. As the spool moves, the feedback spring acts to pull the beam back towards the null position. There is a balance between the torque motor torque, which is proportional to the input current, and the torque created by the spool displacement acting on the feedback spring and returning through the beam to the torque motor. This balance results in a particular spool position, which gives rise to a particular hydraulic flow being passed by the servo valve. The output flow can be controlled so as to be precisely proportional to input current to the torque motor.

The invention claimed is:

1. A servo valve torque motor apparatus comprising:
    a pair of pole pieces; one or more permanent magnets held between the pole pieces; an armature supported between the pole pieces for rotation about an axis; the armature being for connection to a member that resists rotation of the armature; and a coil on the armature; wherein when an electrical current is passed through the coil the armature is rotated against the member; and wherein the one or more magnets are secured to the two pole pieces by mechanical fixings passing through holes through the center of the one or more magnets.

2. A servo valve torque motor as claimed in claim 1, wherein the mechanical fixings are made of non-magnetic material.

3. A servo valve torque motor as claimed in claim 1, wherein the one or more magnets are AlNiCo magnets formed as columns to be fitted between the pole pieces.

4. A servo valve torque motor as claimed in claim 1, wherein the one or magnets are SmCo magnets formed with a cross-section similar to that of an equivalent AlNiCo magnet and supported between spacer columns providing a height similar to that or an equivalent AlNiCo magnet.

5. A servo valve torque motor as claimed in claim 1, wherein the pole pieces are arranged to be used with either one or more AlNiCo magnets formed as columns or with one or more SmCo magnets formed with a cross-section similar to that of the AlNiCo magnet and supported between spacer columns providing a height similar to that or the AlNiCo magnet.

6. A servo valve torque motor as claimed in claim 1, further comprising a shim for adjusting the size of an air gap between the armature and the pole pieces.

7. A servo valve torque motor as claimed in claim 1, wherein there are multiple magnets symmetrically arranged with reference to the axis.

8. A servo valve torque motor as claimed in claim 1, wherein the pole pieces each have a C-shape.

9. A servo valve torque motor as claimed in claim 1, wherein the armature is arranged to, at rest, have an end piece placed between two poles of the pole pieces.

10. A servo valve torque motor as claimed claim 1, wherein the pole pieces may each have a pair of poles, the armature is symmetrically arranged about the axis of rotation with two end pieces, and each end piece is, at rest, located between two poles of the pole pieces.

11. A servo valve torque motor as claimed in claim 1, further comprising two coils with windings about the armature, the two coils being located on two sides of the axis of rotation of the armature.

12. An electrohydraulic servo valve comprising a servo valve torque motor as claimed in claim 1.

13. An actuator for aerospace use comprising an electrohydraulic servo valve as claimed in claim 12.

* * * * *